Sept. 28, 1948.  L. E. SIMMONS  2,450,257
REEL MECHANISM
Filed April 20, 1944  2 Sheets-Sheet 1

Inventor:
Leon E. Simmons.

Sept. 28, 1948.　　　L. E. SIMMONS　　　2,450,257
REEL MECHANISM
Filed April 20, 1944　　　2 Sheets-Sheet 2
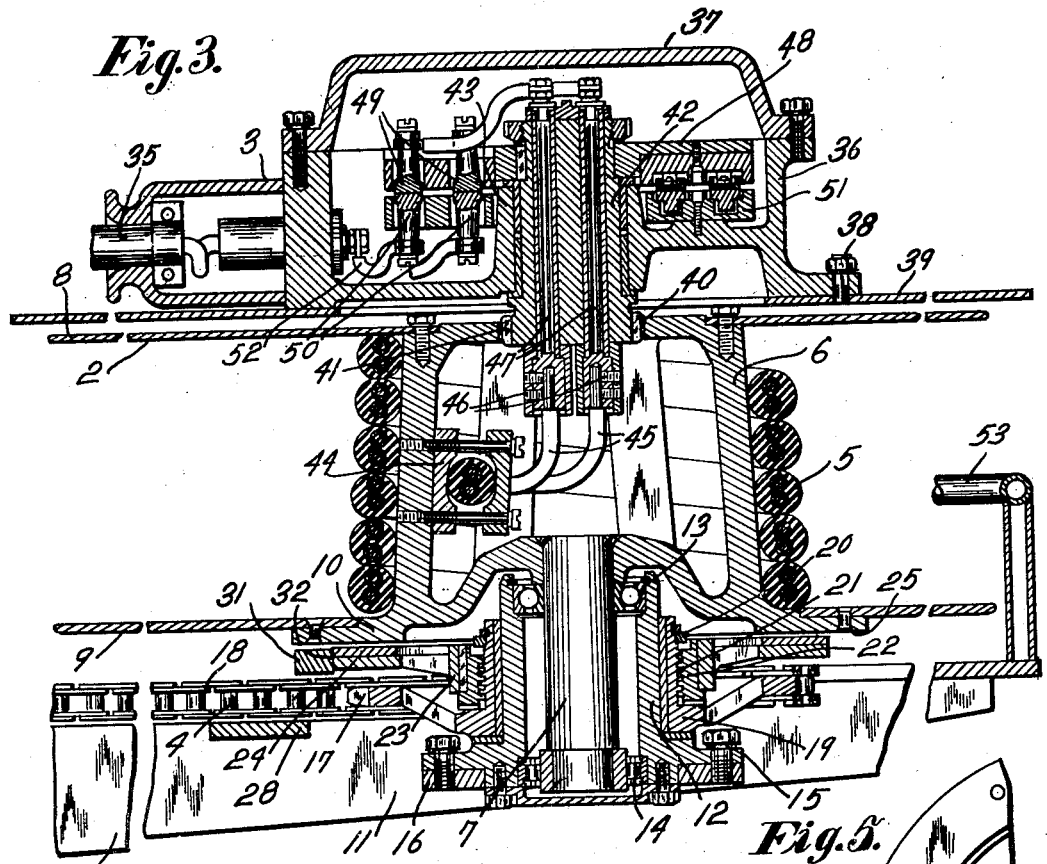
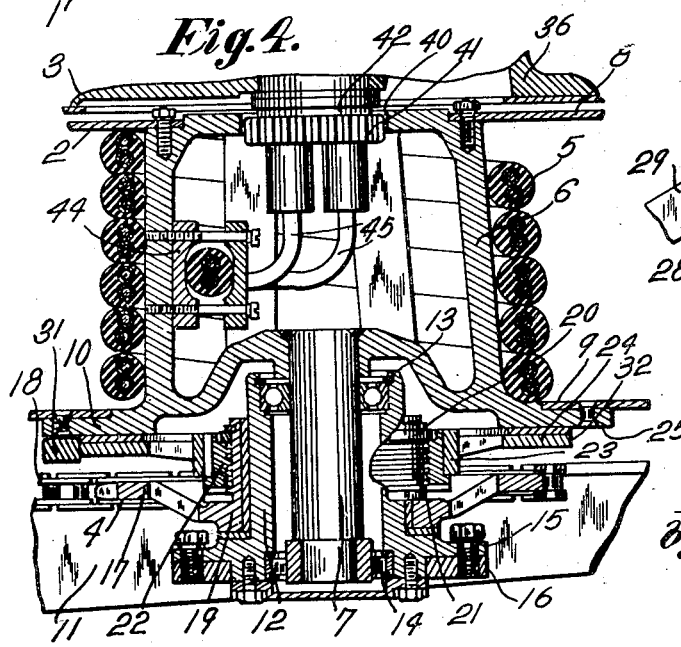
Inventor:
Leon E. Simmons.
by
Louis A. Watson.
atty.

Patented Sept. 28, 1948

2,450,257

UNITED STATES PATENT OFFICE 2,450,257

REEL MECHANISM

Leon E. Simmons, Claremont, N. H., assignor to Joy Manufacturing Company, a corporation of Pennsylvania Application April 20, 1944, Serial No. 531,912

7 Claims. (Cl. 191—12.2)

This invention relates to reel mechanism and more particularly to an electric cable reel mechanism having a detachable connection between the electrical contact unit and the cable reel whereby the contact unit may be removed without disturbing the cable reel on its bearing mounting.

In the transmission of motive power to the motor devices of a vehicle, such as vehicle for carrying a mining mechanism, a flexible power conductor element is usually wound on a winding reel carried by the vehicle and driven by power connections on the vehicle. When the motive power used is electricity, there are usually provided relatively rotatable electrical contacts through which the power is conducted from the cable wound on the reel to the cable leading to the motor devices of the vehicle. From one aspect, the present invention resides in an improved power conductor mechanism, and, from another aspect, in an improved electrical contact apparatus between rotatable and stationary parts of the reel mechanism, which may be readily detached without disturbing the relation of the reel with respect to its bearing mounting.

An object of the present invention is to provide an improved reel mechanism for a power conductor element. Another object is to provide an improved electric cable reel mechanism. A further object is to provide improved electrical contact apparatus for a cable reel whereby a portion of the electrical connections may be readily removed without disturbing the cable reel on its bearing mounting. A still further object is to provide an improved detachable connection between the electrical contact unit and the cable reel, whereby the contact unit may be bodily detached from the reel as a unit while the electrical contacts remain totally enclosed in their housing and without disturbing the mounting of the reel on its support. These and other objects and advantages of the invention will, however, hereinafter more fully appear.

In the accompanying drawings there is shown for purposes of illustration one form which the invention may assume in practice.

In these drawings.

Fig. 3 is an enlarged view in longitudinal vertical section taken substantially on line 3—3 of Fig. 1 showing the cable reel in lowered position with the clutch released.

Fig. 4 is a fragmentary sectional view taken on the plane of Fig. 3, showing the cable reel in raised position with the clutch applied.

Fig. 5 is an enlarged detail horizontal view taken substantially on line 5—5 of Fig. 2.

Figure 1:
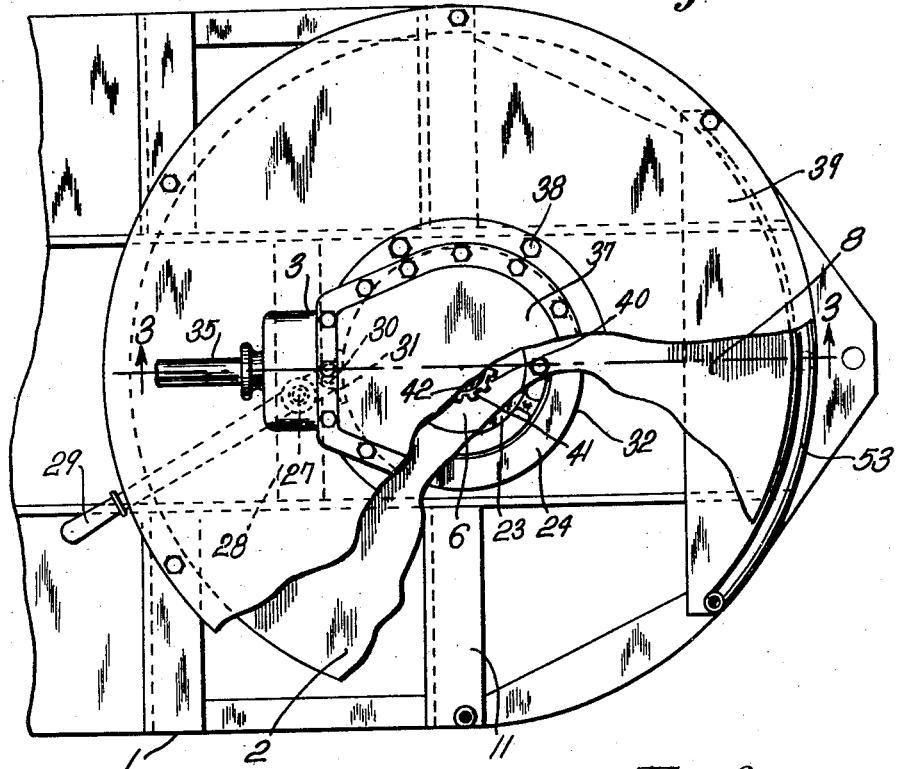
Fig. 1 is a fragmentary plan view, partially broken away to show structural details, of a cable reel constructed in accordance with an illustrative embodiment of the invention.
Figure 2:
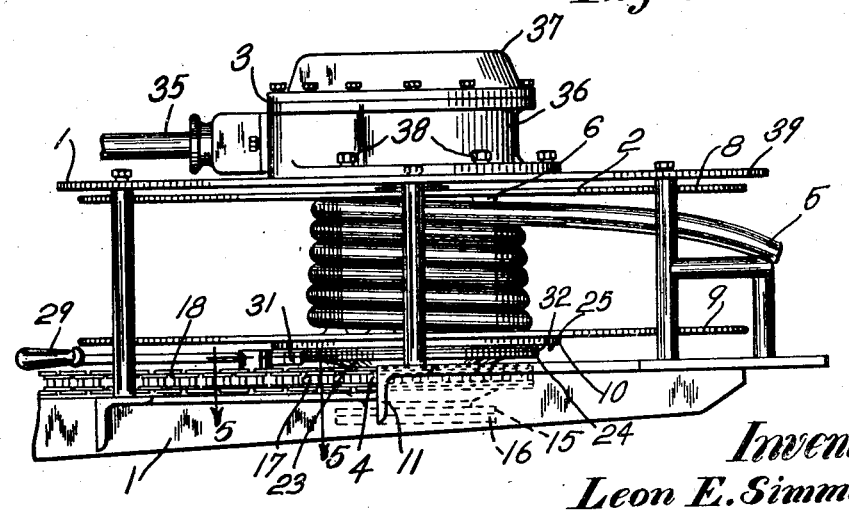
Fig. 2 is a side elevational view of the reel mechanism shown in Fig. 1.

In this illustrative embodiment of the invention, there is shown a support structure 1 on which a cable reel 2 is mounted, the latter having improved electrical connections 3 and improved driving mechanism 4. The driving mechanism is disclosed and claimed in my copending application Serial No. 595,899, filed May 26, 1945, which is a continuation-in-part of the present application. The support structure which may be associated with any suitable vehicle and is herein embodied in a wheeled truck by which a mining mechanism such as a coal cutter is carried for transporting the same from place to place about the mine and during the mining operation. The improved cable reel is preferably embodied in means for transmitting electricity to the electric motor devices of the vehicle and has wound thereon a flexible power conductor cable 5 which, in a mining mechanism, may be connected to a trolley wire and to a ground in the main entry of a mine so that electricity may be conducted to the motor devices of the mining mechanism as it moves out of the main entry into a mine passage leading to the working face.

Now referring to the improved structure of the cable reel 2, it will be noted that the reel has a perforated, hollow hub 6 fixed to a vertical shaft 7 extending downwardly from the reel hub, as shown in Fig. 3. Attached to the reel hub are top and bottom flangelike plates 8 and 9, the former being secured to the top of the reel hub as by screws, and the latter being secured to the bottom hub flange 10 as by rivets in the manner shown, and these plates form the sides of the reel so that the conductor cable may be confined therebetween as it is wound on the reel hub. The support structure 1 includes a bottom frame 11 carrying an upright cylindrical support 12 for upper and lower bearings 13 and 14. The reel shaft 7 has slight vertical axial movement in its bearings for a purpose to be later explained. This bearing support 12 has a bottom flange 15 attached as by screws to a cross plate 16 of the bottom support frame. Journaled on a bearing sleeve supported by the bearing support 12 is a driving element herein in the form of a chain sprocket 17 driven through suitable connections including an endless driving chain 18, the latter extending within the bottom frame structure in the manner shown. The drive sprocket 17 has a hub 19 resting on a bearing washer supported by the bearing support flange. The sprocket hub 19 has adjacent its upper end a motion limiting ring 20 and is externally screw threaded at 21 for engagement with the threads of a vertically movable nut 22 to which the hub 23 of a friction clutch plate 24 is keyed and by which said friction clutch plate is supported. This friction clutch plate, when moved upwardly, is engageable with a plane bottom surface 25 on the reel hug flange 16. Pivotally mounted at 27 on a cross plate 28 is a hand lever 29 in turn pivotally connected at 30 to a brake shoe 31. This brake shoe is movable into engagement with the outer rim 32 of the friction clutch plate 24 so that at times rotation of the friction clutch plate may be frictionally resisted by the shoe.

As the vehicle with which the cable reel is associated is propelled in a direction towards the front where the outer end of the cable 5 is connected, the chain and sprocket effects drive of the reel in a direction to wind in the conductor cable, the nut 22 travelling upwardly along the screw from the position shown in Fig. 3 to that shown in Fig. 4 and moving the friction plate upwardly into contact with the bottom plane surface 25 of the reel hub flange, so that the friction plate slightly lifts the cable reel so that the weight of the latter on the friction plate maintains the friction clutch applied. The reel shaft 7 slides axially in an upward direction in its bearings when the reel is raised. Under most conditions, the clutch plate 25 and nut 22 remain stationary as a result of inertia while the screw acts on the nut to effect raising of the reel and application of the clutch, but under some conditions the nut must have its rotation frictionally resisted, and this may be accomplished by moving the brake shoe 31 into engagement with the rim 32 of the clutch plate frictionally to resist clutch plate rotation. The cable reel is shown in Fig. 4 in raised position with the clutch applied. When the drive sprocket 17 is driven in the reverse direction, and it is desired to prevent paying out of the cable, the nut, friction plate and reel move downwardly to the position shown in Fig. 3 to effect clutch release and thereafter the conductor cable 5 may be freely unwound from the reel.

Electricity may be transmitted from the conductor cable 5 through the rotating cable reel to a conductor cable 35 leading to the electric motor devices of the vehicle. These electrical connections include a top frame or housing 36 having a detachable cover plate 37 and attached as by screws 38 to the top plate 39 of the support structure 1. The upper portion of the hub 6 of the cable reel has clutch teeth 40 which are slidingly interlocked with clutch teeth 41 formed on the lower end of a vertical shaft 42. This shaft is suitably journaled within bearing sleeves supported by an upstanding bearing support 43 integral with the housing 36. Thus through the sliding interlocking connection 40, 41, the shaft 42 may be driven from the reel regardless of whether the reel is raised or lowered. An end of the conductor cable 5 extends within the hollow hub 6 and is clamped in position by an adjustable clamp 44, and the wires 45 of the conductor cable are releasably connected as by clamping screws 46 to conductor elements 47 arranged within upright bores in the shaft 42. The upper end of the vertical shaft 42 carries a support 48 for rotating contact rings 49 to which the conductor elements 47 are suitably connected. Thus, as the reel rotates, the contacts 49 rotate therewith, and these contacts 49 slidably engage contacts 50 mounted on a stationary plate 51 secured to the housing 36. The contacts 50 are connected through wires 52 to the conductor cable 35. By removing the screws 38, and releasing the wires 45 from the conductor elements 47, the housing 36 together with the electrical contact apparatus carried thereby may be bodily removed as a unit from the support structure while its electrical contacts remain totally enclosed in the housing and without disturbing the relation of the cable reel with its bearing mounting. The clutch 41 on the shaft 42 will slide out of interlocking engagement with the clutch teeth 40 on the reel hub as the housing 36 is lifted from its position on the top plate 39, and the screws 46 may be turned back to release the conductors 45 when the housing 36 has been raised sufficiently. By such an arrangement assembly and disassembly of the electrical contact apparatus of the reel is facilitated. Arranged at the rear side of the reel and mounted on the bottom frame 11 of the support structure, is a curved guard 53 for guiding the conductor cable 5 as it is extended from the reel.

From the foregoing, it is evident that when the vehicle is propelled in one direction, as for instance, in a mining mechanism, from the main entry of a mine into a mine passage leading to the working face, the clutch is automatically released and the conductor cable 5 is paid out from the reel directly by the pull of the cable. When the vehicle is propelled in the opposite direction, that is, away from the working face, the clutch is automatically applied and the conductor cable 5 is wound in by power. By the particular structure provided, when the clutch is released and the reel is disconnected from its drive, the conductor cable 5 may be freely unwound from the reel by hand. By the provision of the detachable interlocking connection between the contact unit and the cable reel, the contact unit may be readily detached from the reel while the electrical contacts thereof remain totally enclosed in their housing and without disturbing the relation of the reel on its mounting. Other uses and advantages of the invention will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In a cable reel mechanism, a cable reel, a support on which said cable reel is journaled, a power conductor cable leading from said reel, electrical contact apparatus completely enclosed in a housing attached to said support and including relatively rotatable contacts between said reel and said second mentioned power conductor cable, and releasable connections between said reel and said contact apparatus whereby said apparatus while enclosed in its housing may be removed without disturbing said support and the mounting of said reel on its journal.

2. In a cable reel mechanism, a cable reel upon which a power conductor cable is adapted to be wound, a support on which said cable reel is journaled, electrical contact apparatus completely enclosed in a housing attached to said support and including relatively rotatable contacts between said reel and a power conductor cable to which electricity may be conducted from said reel through said contact apparatus, and releasable connections between said reel and said contact apparatus whereby said apparatus while enclosed in its housing may be removed without disturbing said support and the relation of said reel on its journal, said electrical contact apparatus including an element driven by said reel, and said releasable connections including a releasable interlocking connection between said element and said reel and said element movable out of interlocking connection with said reel when said contact apparatus is disassembled.

3. In a cable reel mechanism, a cable reel, a support on which the reel is mounted for both rotation and limited axial movement, an electric contact unit mounted on said support including relatively rotatable contacts adapted for connection to a cable on the reel and a cable leading to a prime mover, and a sliding interlocking connection between the reel and said rotatable contact for maintaining the drive therebetween irrespective of the axially adjusted position of the reel, said sliding interlocking connection also permitting said contact unit to be removed bodily from said support without disturbing the relation of said reel with respect to said support.

4. In a cable reel mechanism, a support, a cable reel journaled on said support and adapted to have a power conductor cable wound thereon, a stationary housing detachably secured to said support and cooperating stationary and rotatable electrical contacts completely enclosed in said housing, and a disconnectible transmission connection between said rotable contact and said reel whereby said reel and said rotatable contact turn together, said connection extending along the reel axis into said housing, said stationary contact adapted to have a power conductor cable extending into said housing into connection therewith and said rotatable contact being adapted for connection with the cable on said reel, said housing being detachable bodily from said support while said contacts remain enclosed therein, and said connection releasing automatically upon such bodily removal of said housing.

5. In a cable reel mechanism, a support having an upper frame, a cable reel journalled on an upright axis on said support beneath said upper frame, said reel adapted to have a power conductor cable wound thereon, a stationary housing detachably secured to the top of said upper frame above said reel, cooperating stationary and rotatable electrical contacts completely enclosed in said housing, and a disconnectible transmission connection between said reel and said rotatable contact whereby said reel and said rotatable contact turn torether, said transmission connection extending along the reel axis upwardly into said housing, said stationary contact adapted to have a power conductor cable extending into said housing into connection therewith and said rotatable contact being adapted for connection with the cable on said reel, said housing being detachable bodily in an upward direction from said upper frame while said contacts remain enclosed therein, and said transmission connection being automatically released upon such bodily removal of said housing.

6. In a cable reel mechanism, a cable reel, a support on which said reel is mounted for both rotation and limited axial movement, an electrical contact unit secured to said support and relative to which said reel is axially movable, said unit including relatively rotatable contacts adapted for connection to a cable on said reel and a cable leading to a prime mover, and driving means between said reel and said rotatable contact including a sliding interlocking connection for maintaining the drive between said reel and said rotatable contact irrespective of the axially adjusted position of said reel relative to said unit, said sliding interlocking connection also permitting bodily removal of said contact unit from said support while the relation of said reel with respect to said support remains undisturbed, said connection sliding automatically out of interlocking relation upon bodily removal of said unit.

7. In a cable reel mechanism, a support, a cable reel journaled on said support, an electrical contact unit detachably secured to said support and comprising a housing having relatively rotatable contacts totally enclosed therein, and a releasable driving connection between said reel and the rotatable contact whereby said reel and the rotatable contact turn together, said contact unit being bodily removable from said support while said contacts remain totally enclosed therein and the mounting of the reel on its journal remains undisturbed, said driving connection releasing automatically upon such bodily removal of said unit.

LEON E. SIMMONS.

REFERENCES CITED

The following references are of record in the file of this patent:

UNITED STATES PATENTS

| Number | Name | Date |
| --- | --- | --- |
| 1,120,572 | Waxbom | Dec. 8, 1914 |
| 1,135,468 | Sessions | Apr. 13, 1915 |
| 1,297,146 | Gleason | Mar. 11, 1919 |
| 1,409,328 | Wolfe | Mar. 14, 1922 |
| 1,689,098 | Wyman | Oct. 23, 1928 |
| 1,747,411 | Anderson | Feb. 18, 1930 |
| 2,055,681 | Cartlidge | Sept. 29, 1936 |
| 2,112,776 | Harris | Mar. 29, 1938 |
| 2,161,818 | Joy | June 13, 1939 |